United States Patent Office 2,976,311
Patented Mar. 21, 1961

2,976,311
DITHIOPHOSPHORIC ACID ESTERS

Gerhard Schrader, Wuppertal-Cronenberg, Germany, assignor to Farbenfabriken Bayer Aktiengesellschaft, Leverkusen, Germany, a corporation of Germany No Drawing. Filed Oct. 29, 1957, Ser. No. 693,006

Claims priority, application Germany Dec. 10, 1956

5 Claims. (Cl. 260—461)

The present invention relates to dithiophosphoric acid esters and to a process of producing them. Generally the new esters of the present invention may be represented by the following formula

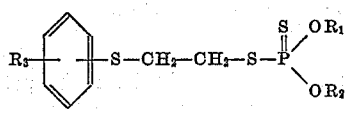

in which $R_1$ and $R_2$ stand for lower alkyl radicals especially such ones containing 1 to 4 carbon atoms, and $R_3$ stands for hydrogen, a lower alkyl group of the same type as $R_1$ and $R_2$ or a halogen atom especially chlorine or bromine.

Dithiophosphoric acid esters, especially such ones having an alkyl mercapto alkyl group have become known insecticides recently. It is an object of the present invention to find other valuable insecticides or more generally plant-protecting agents in the class of dithiophosphoric acid esters. Another object is a method of preparing those esters. Still further objects will become apparent as the following description proceeds.

Now in accordance with this invention it has been found that compounds of the above shown type may be obtained by reacting aryl mercapto alkyl halides with ammonium salts of O.O-dialkyl dithiophosphoric acid esters. Using β-chloro ethyl phenyl sulfide and O.O-diethyl dithiophosphoric acid as starting materials this reaction may be shown by the following reaction scheme:

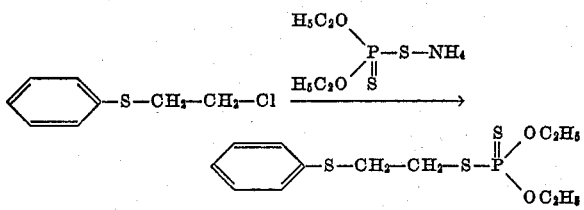

Instead of the afore shown phenyl chloro ethyl sulfide, however, also the corresponding p-chloro phenyl-, p-bromo phenyl-, p-methyl phenyl-, p-ethyl phenyl-, and p-propyl phenyl-sulfides may be used. Instead of the chloro ethyl compounds also the corresponding β-bromo ethyl compound may sucessfully be used for completing the above shown reaction. It is not absolutely necessary to use acid-binding agents for performing the inventive reaction. In most cases the free acid and the aryl mercapto ethyl chloride are able to enter reaction without any acid-binding agent at all, thereby splitting off hydrochloric acid which escapes. In the last case most times no inert solvent is necessary. If a solvent should be used it is preferable to choose such solvents boiling between about 90 to 150° C., especially xylene, toluene and the like. In case the aryl chloro ethyl sulfides are reacted with free O.O-dialkyl dithiophosphoric acids the reaction generally should be carried out between about 60° to 150° C., preferably between 75 to 100° C.

The compounds of the present invention are generally valuable insecticides and plant-protecting agents. They kill pests such as aphids, flies and mites and exhibit a very remarkable systemic action. The application of these compounds should be carried out according to the use of other known phosphor insecticides, i.e. in dilution or solution with solid or liquid carriers such as chalk, talk, bentonite, water, alcohols, liquid hydrocarbons, etc. The inventive compounds may further be used in combination with other known insecticides or pesticides, etc. Effective concentrations of the compounds may vary also; generally, concentrations of 0.0001% to 1.0% kill pests effectively. The combinations of the compounds may be sprayed or dusted or otherwise brought in contact with pests or plants to be protected. They may also be used as aerosols.

As a special example for the utility the compound of the following formula

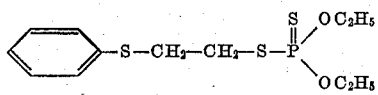

has been tested against black bean aphids. Black beans of about 5 inches height have been infected with aphids and then sprayed drip wet with 0.01% of aqueous emulsions of the above shown compounds. After 24 hours all pests were killed. The 0.01% solutions have been prepared by mixing same amounts of the above shown active ingredient and acetone, thereafter adding about 20% its weight (referred to active ingredient) of a commercial emulsifier consisting of a benzyl hydroxyl diphenyl polyglycol ether and then diluting this premixture with water to the above said concentration.

The following examples are given by way of illustration only, without limiting the present invention thereto.

Example 1

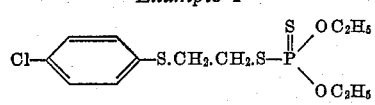

63 grams of β-chlorethyl-(4-chlorophenyl)-thioether of the following formula

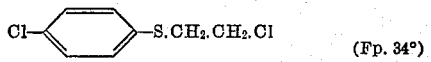

(Fp. 34°)

are heated with stirring with 57 grams of diethyl-dithiophosphoric acid to 95–100° C. for 2 hours. Hydrochloric acid escapes. The reaction product is poured onto ice, neutralised with a 5 percent sodium bicarbonate solution, taken up with ether, dried and fractionated. 40 grams of the new esters, B.P. 144° C./0.01 mm. Hg, are thus obtained as a water-insoluble pale yellow oil. $DL_{50}$ on rats orally: 100 mg./kg.

Example 2

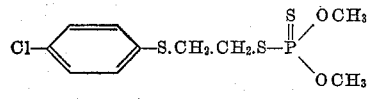

63 grams of β-chlorethyl-(4-chlorophenyl)-thioether are heated with stirring with 53 grams of dimethyl-dithiophosphoric acid to 90–95° C. for 1½ hours. The mixture is worked up as described in Example 1. 20 grams of the new ester of B.P. 135° C./0.01 mm. Hg are thus obtained. $DL_{50}$ on rats orally 100 mg./kg.

Example 3

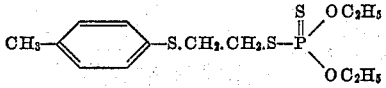

94 grams of β-chloroethyl-(4-methylphenyl)-sulphide (B.P. 108° C./2 mm. Hg, M.P. +20° C.) are heated with 90 grams of diethyl-dithiophosphoric acid in 200 millilitres of benzene to 75° C. for 1½ hours. The reaction mixture is poured into ice-water, neutralised with a 5 percent sodium bicarbonate solution and then worked up as described in Example 1. 70 grams of the new ester, B.P. 141° C./0.01 mm. Hg, are thus obtained. DL$_{50}$ on rats orally 100 mg./kg.

*Example 4*

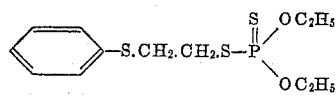

35 grams of β-chlorethylphenylsulphide (98° C. B.P./2 mm. Hg) are added with stirring to 38 grams of diethyl-dithiophosphoric acid. The mixture is heated to 90° C. for 1½ hours and then worked up in usual manner. 35 grams of the new ester, B.P. 143° C./0.01 mm. Hg are thus obtained as a water-insoluble pale yellow oil. DL$_{50}$ on rats orally 50 mg./kg. 0.01 percent solutions kill plant lice completely.

Instead of the above described p-substituted phenyl derivatives also the corresponding o- or m-derivatives may be prepared by using exactly the same molecular amount of the corresponding starting materials, i.e. the o- or m-substituted phenyl-β-halo ethyl sulfides.

I claim:
1. Dithiophosphoric acid esters of the following formula

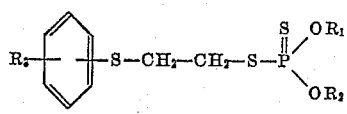

in which R$_1$ and R$_2$ stand for lower alkyl radicals and R$_3$ stands for a member selected from the group consisting of halogen and lower alkyl radicals.

2. A dithiophosphoric acid ester of claim 1 wherein R$_1$ and R$_2$ stand for lower alkyl radicals containing 1 to 4 carbon atoms.

3. A dithiophosphoric acid ester of the following formula:

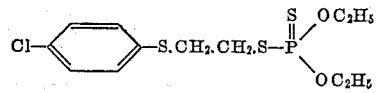

4. A dithiophosphoric acid ester of the following formula:

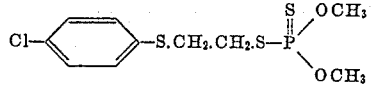

5. A dithiophosphoric acid ester of the following formula:

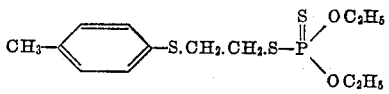

References Cited in the file of this patent
UNITED STATES PATENTS

| | | |
|---|---|---|
| 2,565,920 | Hook et al. | Aug. 28, 1951 |
| 2,571,989 | Schrader | Oct. 16, 1951 |
| 2,597,534 | Schrader | May 20, 1952 |
| 2,793,224 | Fancher | May 21, 1957 |

FOREIGN PATENTS

| | | |
|---|---|---|
| 850,677 | Germany | Sept. 25, 1952 |
| 16,487 | Germany | Feb. 23, 1956 |
| 17,346 | Germany | Aug. 2, 1956 |